United States Patent [19]

Rea

[11] 3,808,402
[45] Apr. 30, 1974

[54] TEMPERATURE REGULATOR FOR ELECTRIC OVENS

[75] Inventor: William George Rea, Mississauga, Ontario, Canada

[73] Assignee: Thermetic Controls Limited, Mississauga, Ontario, Canada

[22] Filed: Mar. 29, 1973

[21] Appl. No.: 347,046

[52] U.S. Cl.............. 219/413, 219/412, 219/483, 219/408, 219/513, 337/322
[51] Int. Cl............................................. A21b 1/00
[58] Field of Search .......... 219/412, 413, 483, 486, 219/489, 512, 507, 508; 337/322

[56] References Cited
UNITED STATES PATENTS

| | | | |
|---|---|---|---|
| 3,358,121 | 12/1967 | Bowling | 219/413 X |
| 3,462,584 | 8/1969 | Guy | 219/412 |
| 3,604,896 | 9/1971 | Anderson et al. | 219/412 |

Primary Examiner—Bernard A. Gilheany
Assistant Examiner—Fred E. Bell
Attorney, Agent, or Firm—Ridout & Maybee

[57] ABSTRACT

A temperature regulator comprises oven temperature sensing means, temperature responsive switching means operable by the sensing means to control the supply of electric current to the elements, a manually operable rotary control means connected to the temperature responsive switching means and operable to vary the temperature setting thereof, selector means comprising first and second selector switches in series with the baking and broiling elements, respectively, and switch actuator means operable by the rotary control means to move the selector means into any selected one of four operative configurations corresponding to an OFF position, a "CONTROLLED BAKE" position, an "AUTOMATIC PRE-HEAT" position, and a "CONTROLLED BROIL" position, respectively.

10 Claims, 13 Drawing Figures

TEMPERATURE REGULATOR FOR ELECTRIC OVENS

BACKGROUND OF THE INVENTION

This invention relates to an improved temperature regulator for electric ovens of the type having independent baking and broiling elements.

In electric ovens of this type it is common practice to provide a regulator which will operate to connect the baking element and the broiling element simultaneously to the power supply so as to effect rapid pre-heating of the oven, and then to disconnect the broiling element automatically when a certain oven temperature is reached, the baking element thereafter being operated to maintain the oven at a desired temperature. While such a regulator has the advantage of providing rapid pre-heating of the oven, it has the disadvantage that the oven cannot be operated in the BAKE mode without preheating. It is often desirable to heat an oven from room temperature to a high baking temperature without operating the broiling element, as for example when the baking is to be controlled by a clock, in which case direct heat from the broiling element might spoil food initially in the oven. Furthermore it is often necessary to operate the baking element to raise the temperature of the oven without assistance from the broiling element, as for example when the oven door has been opened causing the oven temperature to drop substantially. Not only is the unwanted operation of the broiling element liable to spoil food, but it is a potential cause of fire.

Temperature regulators have been devised to overcome this problem by providing, in addition to the pre-heating facility described above, means for selectively energizing the baking element independently of the broiling element. One such temperature regulator is described in U.S. Pat. No. 2,224,983, issued Dec. 17, 1940 in the name Malcolm K. Parkhurst and entitled "Temperature Control for Electrical Appliances." Although such regulators overcome the particular problem discussed above, they have certain inherent limitations. First, they do not provide for the selection of BAKE, BROIL and PRE-HEAT modes of operation as well as the selection of a desired oven temperature setting by means of a single manual selector. Second they do not provide for adjustment of the temperature setting of the broiling element, there is to say, they do not permit a CONTROLLED BROIL mode of operation.

It is an object of the present invention to provide an improved temperature regulator for an electric oven, which by means of a single manually operable rotary selector permits the selection of BAKE, BROIL, and PRE-HEAT modes of operation as well as the adjustment of oven temperature setting in each of these modes.

A temperature regulator according to the invention comprises oven temperature sensing means, temperature responsive switching means operable by the sensing means to control the supply of electric current to the elements, a manually operable rotary control means connected to the temperature responsive switching means and operable to vary the temperature setting thereof, selector means comprising first and second selector switches in series with the baking and broiling elements, respectively, and switch actuator means operable by the rotary control means to move the selector means into any selected one of four operative configurations corresponding to an OFF position, a "CONTROLLED BAKE" position, an "AUTOMATIC PRE-HEAT" position, and a "CONTROLLED BROIL" position, respectively.

In order that the invention may be readily understood, one embodiment thereof will now be described, by way of example, with reference to the accompanying drawings.

DESCRIPTION OF THE PREFERRED EMBODIMENT

General

Figure 2:
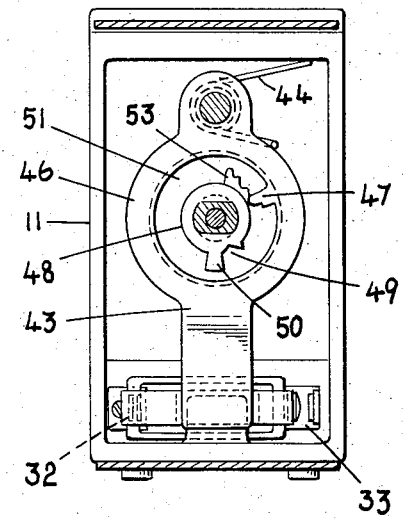
FIG. 2 is a sectional elevation on line 2—2 in FIG. 1.

The improved temperature regulator illustrated in the drawings is adapted to be used with an electric oven having independent baking and broiling elements energized from an electric current source. A single rotary control knob is provided to control the selection of the baking and broiling elements according to the desired mode of heating, and to control the temperature setting of the oven over a continuous range.

Figure 13:
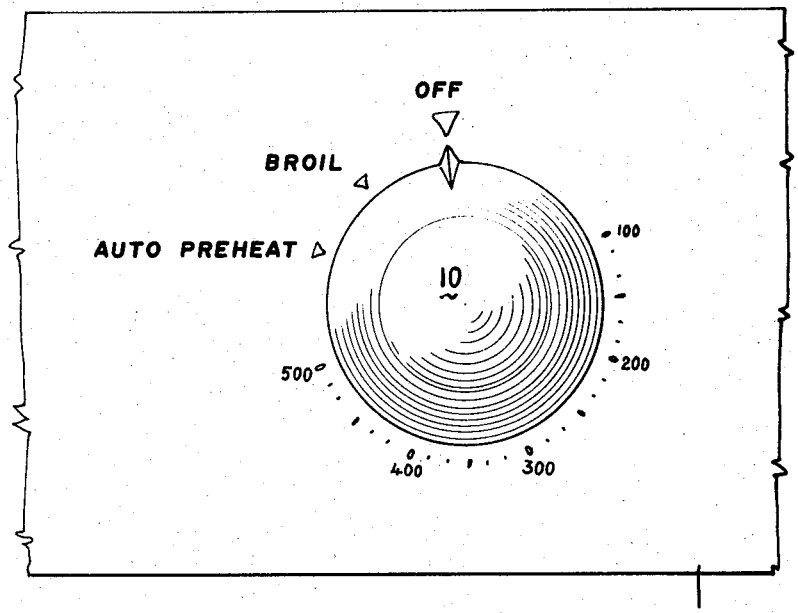
FIG. 13 is a frontal view of the control knob of the control assembly, showing the various control settings.

As shown in FIG. 13, the rotary control knob 10 has an OFF position, and is rotatable in a clockwise direction therefrom to a first limit position marked AUTO PRE-HEAT, and to a second limit position marked BROIL. Between the OFF position and the first limit position the control knob 10 is rotatable to vary the temperature setting of the oven over a range indicated by a graduated scale. In the OFF position of the control knob, both the baking and broiling elements are disconnected from the electric current source. When the control knob is moved from the OFF position, the broiling element remains disconnected, but the baking element is connected to the electric current source and is controlled thermostatically to maintain the oven at a desired temperature depending upon the setting of the knob 10. In order to operate the broiling element to provide rapid pre-heating of the oven, one must rotate the control knob from the OFF position to the first limit position marked AUTO PRE-HEAT, and return the knob to a setting corresponding to the desired oven temperature. This movement of the control knob connects both elements to the electric source, the broiling element subsequently being disconnected automatically at a temperature below the selected temperature, the baking element thereafter being operated thermostatically to bring the oven to the desired temperature and hold it at that temperature. If the user wishes to operate the broiling element only, independently of the baking element, the control knob must be rotated clockwise from the OFF position to the second limit position marked BROIL, and then returned to a scale setting corresponding to the desired oven temperature. This movement of the control knob connects the broiling element only to the electric current source the broiling element thereafter being controlled thermostatically according to setting of the control knob.

Mechanical Arrangement

The temperature regulator basically comprises a control assembly (FIGS. 1 to 3) and a sensor assembly (FIGS. 8 to 10), the latter including a temperature sensing element of the expanding fluid type, positioned to sense the temperature of the oven.

Figure 1:
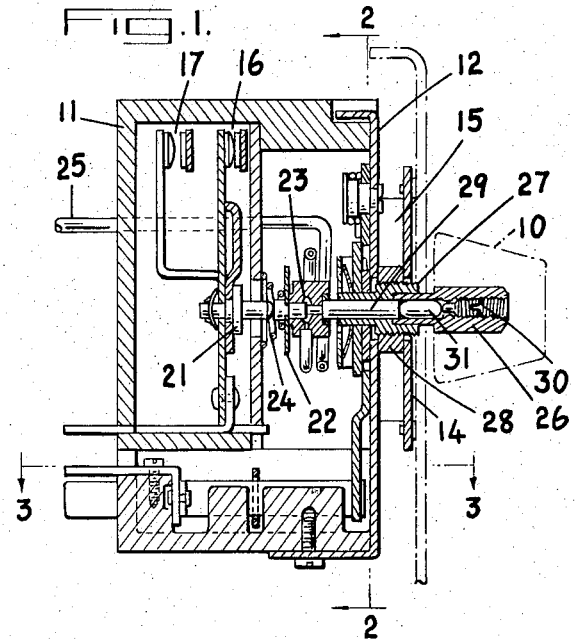
FIG. 1 is a vertical sectional elevation of a control assembly of the regulator.
Figure 3:
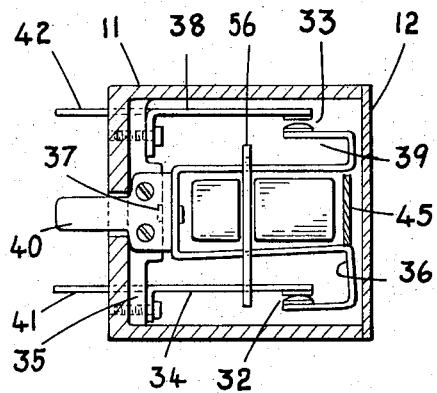
FIG. 3 is a sectional plan on line 3—3 in FIG. 1.

Referring to FIGS. 1 to 3, the control assembly comprises a casing 11 having1a front cover 12, the casing 11 being mounted on the back of a control panel 13 by means of a mounting bracket 14 and spaced from the mounting bracket by bushings 15. The casing 11 houses the following components of the control assembly:

a. temperature responsive switching means operable by the temperature sensing means of the sensor assembly to control the supply of electric current to the baking and broiling elements;

b. manually operable rotary control means connected to the temperature responsive switching means and operable to vary the temperature setting thereof;

c. selective switching means for selecting the baking and broiling elements; and d. switch actuator means operable by the rotary control means for actuating the selective switching means.

Figure 7:
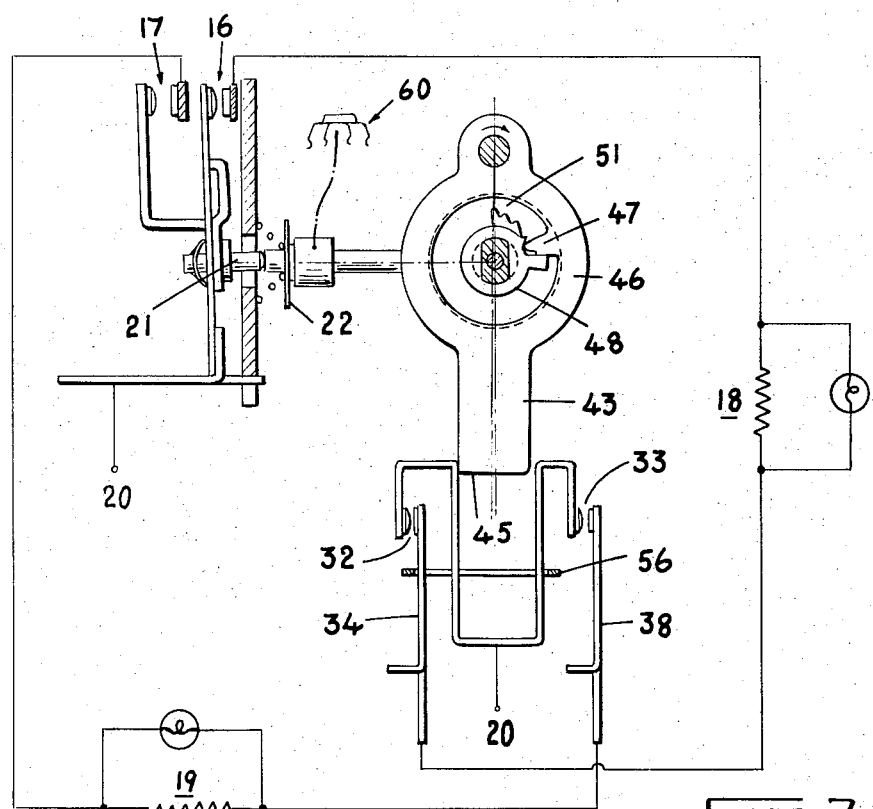
FIG. 7 is a diagrammatic developed view of the control assembly showing the configuration of parts when in the OFF position, the figure also illustrating parts of the circuitry to which the control assembly is connected.

The first of these components, namely the temperature responsive switching means, comprises a pair of contacts 16 (including a fixed contact and a movable contact) constituting a first normally closed switch, and a pair of contacts 17 (including a fixed contact and a movable contact) constituting a second normally closed switch. As shown in FIG. 7 the baking element 18 and the boiling element 19 are arranged to be connected independently to the electric current source 20, the contacts 16 being in series with the baking element to control the supply of electric current thereto, and the contacts 17 being in series with the broiling element to control the supply of electric current thereto. The movable contacts of the pairs of contacts 16, 17 are mounted on an insulator stem 21, one end of which bears against a diaphragm assembly 22. The diaphragm assembly 22 responds to expansion of fluid into a cell 23 so as to urge the stem 21 in the direction to open the contacts 16, 17, and is biassed by a return spring 24 so as to permit the contacts to close when fluid is displaced from the cell 23. A capillary tube 25 connects the cell 23 with the temperature sensing element of the sensor assembly, so that the displacement of fluid to and from the cell, and hence the opening and closing of the contacts 16, 17, are determined by the oven temperature sensed by the sensing element. The pairs of contacts 16, 17 are so arranged that the first pair of contacts will open at the selected oven temperature and the second pair of contacts will open at a somewhat lower temperature.

The manually operable rotary control means comprises a hollow shaft 26 on which the control knob 10 is mounted. The shaft 26 is keyed to a shaft 27 having an external left-hand thread engaging an internally threaded bushing 28. Within the shaft 27 is a stud pin 29, one end of which engages the diaphragm assembly so as to influence the pressure at which the latter will open the contacts 16, 17 in accordance with the axial position of the stud pin. The arrangement is such that when the control knob is rotated in a clockwise direction, the shaft assembly 26, 27 will be displaced axially in such a direction as to reduce the pressure with which the stud pin bears on the diaphragm assembly, and so increase the amount of fluid displacement into the cell 23 required to open the contacts 16, 17. Thus, rotation of the control knob 10 in the clockwise direction raises the selected temperature setting of the oven.

The position of the stud pin 29 can be adjusted, for calibration purposes, by means of a calibrating screw 30 housed in the shaft 26 and bearing on a calibrating pin 31 which locates the stud pin with respect to the shaft assembly.

The selective switching means comprises a first, normally closed, selector switch 32 in series with the baking element 18, and a second, normally open, selector switch 33 in series with the broiling element 19. The selector switches are selectively operable, as hereinafter described, so as to have four operative configurations as follows:

| | | |
|---|---|---|
| (i) | Switch 32 Open | Baking Element Disconnected |
| | Switch 33 Open | Broiling Element Disconnected |
| (ii) | Switch 32 Closed | Baking Element Connected |
| | Switch 33 Open | Broiling Element Disconnected |
| (iii) | Switch 32 Closed | Baking Element Connected |
| | Switch 33 Open | Broiling Element Connected |
| (iv) | Switch 32 Open | Baking Element Disconnected |
| | Switch 33 Closed | Broiling Element Connected |

As best seen in FIG. 3, the first selector switch 32 is formed by a fixed contact near one end of a resilient arm 34 mounted on a mounting plate 35, the fixed contact being engageable with a moving contact mounted on a resilient, blade-like arm 36 of a U-shaped blade assembly mounted on a mounting bracket 37 the moving contact being spring-biassed into engagement with the fixed contact. Similarly, the second selector switch 33 is formed by fixed contact near one end of a resilient arm 38 mounted on the mounting plate 35, the fixed contact being engageable with a moving contact mounted on a resilient, blade-like arm 39 of the U-shaped blade assembly, the moving contact being spring-biassed out of engagement with the fixed contact. The moving contacts of the selector switches are therefore biassed so that they will normally tend to assume the second configuration described above, which is of course the configuration illustrated in FIGS. 1 to 3. Obviously, the contacts must be mounted so as to be electrically insulated from the casing. As shown in FIG. 2, the moving contacts are connected to a common supply conductor 40, and the fixed contacts are connected to respective suply conductors 41, 42.

Figure 4:
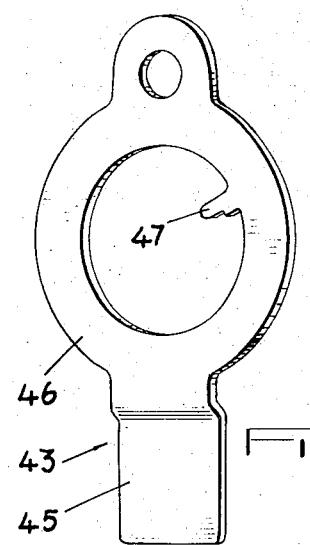
FIG. 4 is a view of a switch actuator member forming part of the control assembly of FIG. 1.

The switch actuator means for actuating the selector switches comprises an actuator member in the form of a pivoted lever 43, the lever 43 being pivotally mounted at one end in the casing 11 and spring-biassed in one direction by a spring 44. The lever is shaped so as to provide a free end 45 which lies between the blade-like arms 36 and 39, and an intermediate portion 46 of annular configuration having a radially inwardly projecting finger 47. The finger 47 is adapted to serve as a cam follower as hereinafter described. The actuator member is illustrated separately in FIG. 4.

Figure 5:
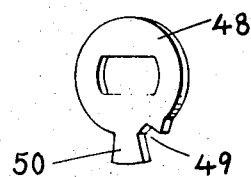
FIG. 5 is a perspective view of a first cam member forming part of the control assembly of FIG. 1.

A first cam member 48, which is illustrated separately in FIG. 5, is fixedly mounted on the shaft 27 so as to be rotatable therewith. This first cam member, which is mounted coaxially with the annular intermediate portion 46 of the actuator member and engageable with the finger 47, has a circular cam portion formed with a detent 49 and radial projection 50.

Figure 6:
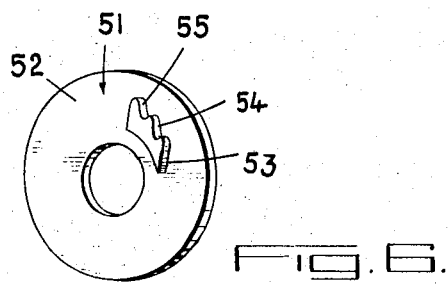
FIG. 6 is a perspective view of a second cam member forming part of the control assembly of FIG. 1.

A second cam member 51, which is illustrated separately in FIG. 6, is freely mounted on the shaft so as to be capable of independent rotation. This second cam member, which is mounted coaxially with the intermediate portion 46 of the actuator member and with the first cam member, is constituted by an annular disc 52 having a cam portion 53 on one face of the disc, the cam portion 53 being formed with a first detent 54 and a second detent 55. The cam portion 53 is engageable with the finger 47, and is also engageable with the radial projection 50 of the first cam member, so that rotation of the first cam member in one direction beyond the position at which the radial projection 50 abuts against the cam portion 53 will cause rotation of the second cam member.

The switch actuator means also includes a link 56 which engages the resilient arm 36 of the first selector switch and also the resilient arm 39 of the second selector switch. The link 56 provides a lost motion coupling between these two arms so as to cause the second selector switch to open when the actuator is moved to an extreme position.

The actuator member 43 is biassed by the spring 44 into a first position, corresponding to the first configuration of the selector switches, the free end 45 of the actuator member urging the resilient arm 34 so as to hold the first selector switch open. The actuator member 43 is movable to a second operative position, corresponding to the second configuration of the selector switches, in which the free end 45 of the actuator member is out of engagement with both resilient arms 34, 39. The actuator member is also movable to a third operative position, corresponding to the third configuration of the selector switches, in which the free end 45 of the actuator member engages the resilient arm 39 to hold the second selector switch closed. Finally, in the fourth position of the actuator member, the free end 45 urges the resilient arm 39 so as to hold the second selector switch closed and the resilient arm 36 of the first selector switch is engaged by the link 56 so as to hold the first selector switch open.

Operation

When the control knob 10 is in the OFF position, the detent 49 of the first cam member 48 is positioned so as to engage the end of the finger 47. The actuator member 43 is biassed into its first operative position, as illustrated in FIG. 7. The selector switches 32 and 33 are both open, and so the baking and broiling elements are both disconnected from the electric current supply. When the control knob 10 is rotated clockwise from the OFF position, the cam member 48 is rotated by a corresponding arm, the finger 47 now being engaged by the circular cam portion of the first cam member. With the finger 47 so engaged, the actuator member 43 is held against its spring bias in the second operative position, corresponding to the second configuration of the selector switches. This configuration is illustrated in FIGS. 1 to 3. The baking element is thus connected to the electric current source, the broiling element remaining disconnected, and the oven is heated to a temperature determined by the temperature setting of the control knob. When the oven reaches the selected temperature, the contacts 16 open in response to the temperature sensing means and thereafter control the supply of current to the baking element to maintain the selected temperature.

Figure 11:
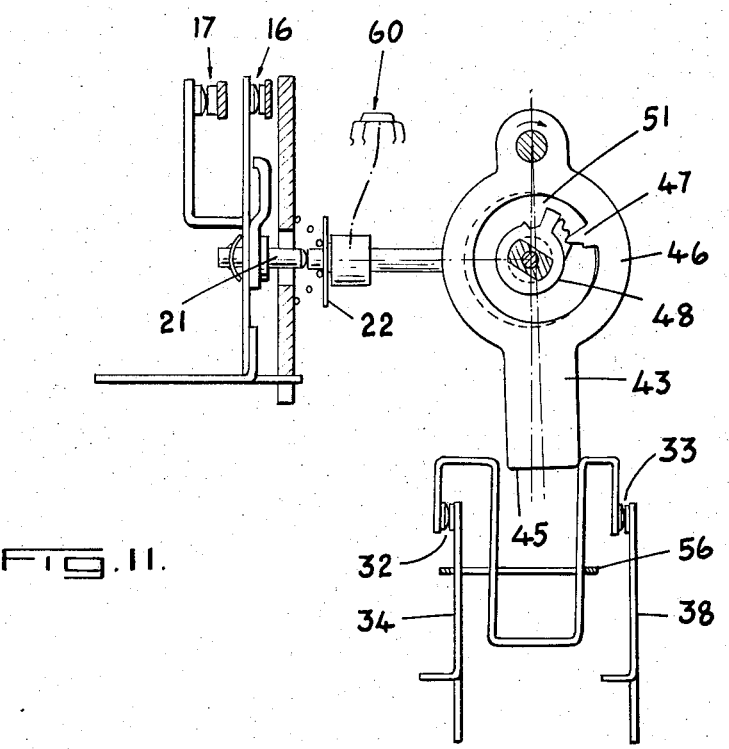
FIG. 11 is a diagrammatic developed view of the control assembly, corresponding to FIG. 7, but showing the configuration of parts when in the AUTO-PREHEAT position.

In order to provide rapid pre-heating of the oven, when required, the control knob 10 is first rotated to the first limit position marked AUTO PRE-HEAT (FIG. 13), and is then returned to the selected temperature setting. This rotation of the control knob 10 causes the first cam member 48 to rotate so that the radial abutment 50 engages the cam portion 53 of the second cam member 51, the latter thereby being rotated until the first detent 54 of said cam portion engages the finger 47. With the finger 47 so engaged, the actuator member is held in the third operative position, corresponding to the third configuration of the selector switches, as illustrated in FIG. 11. Both the baking element and the broiling element are now connected to the current source. As the selected oven temperature is approached, the temperature responsive contacts 17 open, and thereafter the selected temperature is maintained by the baking element under the control of the temperature responsive contacts 16

Figure 12:
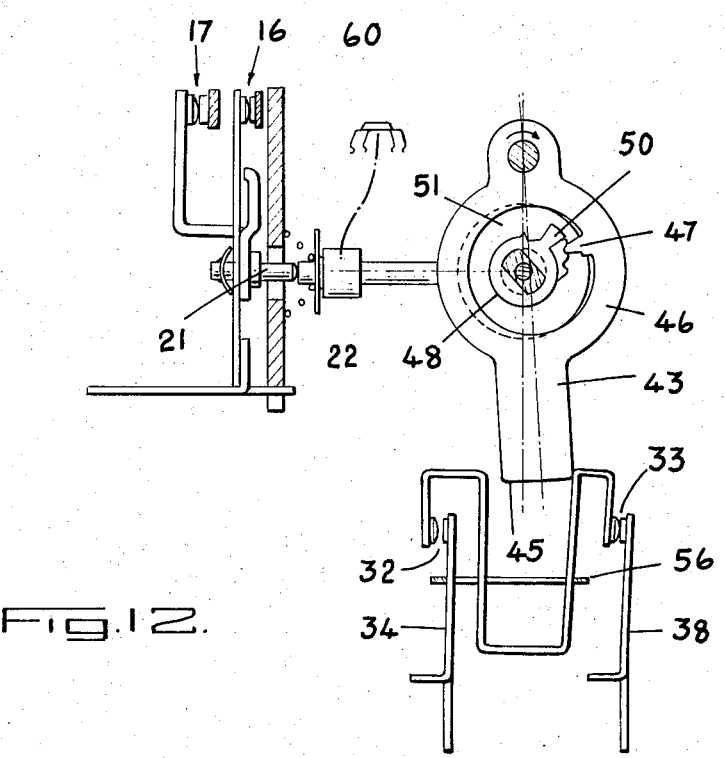
FIG. 12 is a diagrammatic developed view of the control assembly, corresponding to FIG. 7, but showing the configuration of parts when in the CONTROLLED BROIL position.

Finally, if it is only desired to operate the broiling element, the control knob must be rotated to the second limit position marked BROIL (FIG. 13). In this case the second cam member 51 is rotated by the first cam member 48 until the second detent 55 engages the finger 47. With the finger 47 so engaged, the actuator member 43 is held in its fourth operative position, corresponding to the fourth configuration of the selector switches. The baking element is now disconnected from the current source and heating is effected by the broiling element under the control of the contacts 17, in accordance with the setting to which the control knob 10 is returned. The configuration corresponding to this mode of operation is illustrated in FIG. 12.

The Sensor Assembly

Figure 8:
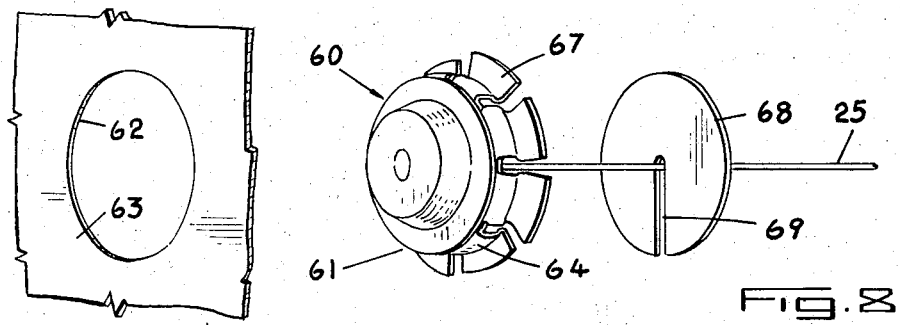
FIG. 8 is an exploded perspective view of the sensor assembly forming part of the temperature regulator and illustrating the manner in which the oven temperature sensing means is to be mounted.
Figure 9:
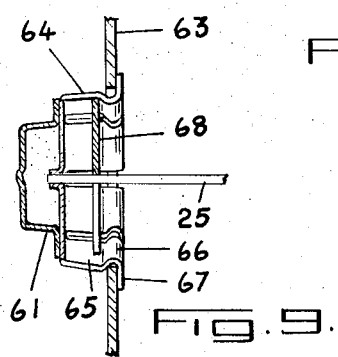
FIG. 9 is a sectional view of the sensor assembly when mounted in the oven wall.
Figure 10:
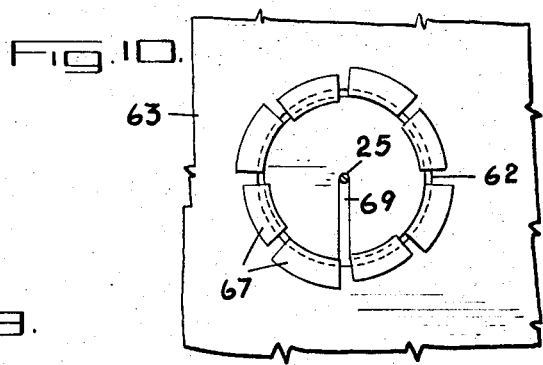
FIG. 10 is a frontal view of the sensor assembly.

Referring to FIGS. 8 to 10, the sensor assembly comprises a temperature sensing element 60 having a housing 61 which is removably mounted in a circular opening 62 in the oven wall 63. The housing 61 provides a slotted skirt 64, forming two sets of alternately positioned resilient legs 65, the legs being shaped to provide an inwardly projecting rib 66 and outwardly splayed feet 67. The legs of one set resiliently engage the periphery of a circular shield 68, the shielf having a slot 69 through which the capillary tube 25 extends, and the legs of the other set resiliently engage the periphery of the opening 62 so as to hold the sensor assembly frictionally in position as shown.

What I claim as my invention is:

1. A temperature regulator for an electric oven having independent baking and broiling elements, comprising
    oven temperature sensing means,
    temperature responsive switching means operable by the sensing means to control the supply of electric current of said elements,
    a manually operable rotary control means connected to the temperature responsive switching means and operable to vary the temperature setting thereof;
    selector means comprising first and second selector switches in series with the baking and broiling elements, respectively, said selector means having four operative configurations including a neutral configuration in which both selector switches are open, a second configuration in which only the first selector switch is closed, a third configuration in which both selector switches are closed, and a fourth configuration in which only the second selector switch is closed, and
    switch actuator means operable by the rotary control means to move the selector means into any selected one of said operative configurations.

2. A temperature regulator according to claim 1, in which the temperature responsive switching means comprises first and second normally closed switches in series with said baking and broiling elements, respectively, the first normally closed switch being adapted to open at a selected oven temperature determined by the temperature setting of the regulator, and the second normally closed switch being adapted to open at an oven temperature lower than said selected temperature.

3. A temperature regulator according to claim 2, in which the rotary control means comprises a rotary shaft and mechanism interconnecting the shaft with the temperature responsive switching means for adjusting the temperature setting thereof, the rotary shaft having an off position and being rotatable therefrom to increase the temperature setting of the regulator over a continuous range up to a maximum temperature setting, the rotary shaft being rotatable beyond the maximum temperature setting to first and second limit positions.

4. A temperature regulator according to claim 3, in which the switch actuator means comprises
    an actuator member engageable with said selector switches and having four operative positions corresponding respectively to said four selector switch configurations,
    spring means biasing the actuator member towards its first operative position,
    first cam means engageable with the actuator member and operable upon rotation of the rotor shaft from its off position to move the actuator member from its first to its second position,
    second cam means engageable with the actuator member and operable upon rotation of the rotary shaft to its first and second limit positions to move the actuator member to its third and fourth operative positions, respectively.

5. A temperature regulator according to claim 3, in which the switch actuator means comprises
    an actuator member engageable with said selector switches and having four operative positions corresponding respectively to the four selector switch configurations,
    the actuator member having a cam follower portion,
    spring means biassing the actuator member towards its first operative position,
    a first cam member fixedly mounted on the rotary shaft and rotatable therewith, the first cam member being engageable with said follower portion to hold the actuator member in its second operative position, and having a detent engageable with said follower portion in the off position of the rotary shaft to permit the actuator member to move to its first position,
    a second cam member freely mounted on the rotary shaft, the second cam member being engageable by the first cam member to be rotated thereby upon rotation of the shaft in the direction of the increasing temperature setting,
    the second cam member having a cam portion which is engageable with the follower portion, said cam portion having a first detent engageable with the follower portion when the rotary shaft is rotated to the first limit position and a second detent engageable with the follower portion when the rotary shaft is rotated to the second limit position, whereby to move the actuator member into its third and fourth operative positions respectively.

6. A temperature regulator according to claim 5, wherein the actuator member is constituted by a lever pivotally mounted at one end and having a free end which is engageable with the selector switches, the lever providing an intermediate portion of annular configuration arranged coaxially with the first and second cam members, said cam follower portion being constituted by a finger projecting radially inwards from said intermediate portion.

7. A temperature regulator according to claim 6, wherein the cam portion of the second cam member is formed with abutment means, and wherein the first cam member is formed with a radially extending abutment adapted to be brought into engagement with said abutment means upon rotation of the rotary shaft in the direction of increasing temperature setting, whereby to rotate the second cam member in said direction, said projecting finger being positioned so as to engage said first and second detents of the cam portion when therotary shaft is rotated to the first and second limit positions, respectively.

8. A temperature regulator according to claim 4, wherein the first and second selector switches are constituted by a first, normally closed, pair of contacts in series with the baking element and a second, normally open, pair of contacts in series with the broiling element, the actuator member being selectively engageable with said pairs of contacts for holding the first pair of contacts open and for holding the second pair of contacts closed, the actuator member engaging the first pair of contacts in its first operative position, engaging the second pair of contacts in its third and fourth operative positions, and being disengaged from both pairs of contacts in its second operative position, the switch actuator means further including means responsive to movement of the actuator member to its fourth operative position to open the first pair of contacts.

9. A temperature regulator according to claim 1, wherein the oven temperature sensing means is provided with a housing adapted to be removably mounted in a circular opening in an oven wall, the housing having a resilient slotted skirt adapted to engage resiliently the periphery of the circular opening.

10. A temperature regulator according to claim 9, wherein the housing includes a circular shield adapted to lie in the circular opening flush with the oven wall, the slotted skirt defining a first set of legs biassed resiliently into engagement with the periphery of said opening and a second set of legs biassed resiliently into engagement with the periphery of said shield.

* * * * *